United States Patent [19]

Puechl

[11] 4,182,652

[45] Jan. 8, 1980

[54] NUCLEAR FUEL ELEMENT, CORE FOR NUCLEAR REACTOR, NUCLEAR FUEL MATERIAL

[76] Inventor: Karl H. Puechl, 16 Drumlin Rd., West Simsbury, Conn. 06092

[21] Appl. No.: 533,641

[22] Filed: Dec. 17, 1974

[51] Int. Cl.[2] .......................................... G21C 15/00
[52] U.S. Cl. ...................................... 176/50; 176/89; 252/301.1 R
[58] Field of Search ............... 252/301.1 S, 301.1 R; 176/78, 28, 40, 41, 80

[56] References Cited

U.S. PATENT DOCUMENTS

| | | | |
|---|---|---|---|
| 2,868,707 | 1/1959 | Alter | 252/301.1 R |
| 3,147,191 | 9/1964 | Crowther | 176/78 X |
| 3,254,030 | 5/1966 | Michaud et al. | 423/351 |
| 3,531,416 | 9/1970 | Akutsu et al. | 252/301.1 S |
| 3,671,453 | 6/1972 | Triggiani et al. | 252/301.1 S |
| 3,745,069 | 7/1973 | Sofer et al. | 176/78 |
| 3,802,995 | 4/1974 | Fritz et al. | 176/78 X |

OTHER PUBLICATIONS

International Atomic Energy Agency, "Directing of Nuclear Reactions", vol. I, pp. 39-42 (1959) Vienna. TK 9202 15.
Bloomster I, *Nucl. Sci. Abs.*, 19, Abs. #47976 (1965).
Bloomster II, *Nucl. Sci. Abs.*, 24, Abs. #47977 (1965).
Uotinen et al., *Nucl. Sci. Abs.*, 24, Abs. *#43853 (1970).*

*Primary Examiner*—Edward A. Miller
*Attorney, Agent, or Firm*—Hymen Diamond

[57] ABSTRACT

The nuclear fuel material includes up to 1% of plutonium and the remainder enriched uranium of an enrichment necessary to achieve a desired fissile content. A typical nuclear fuel material includes 0.160% fissile plutonium or 0.216% total plutonium and 99.784 uranium of 3.171 enrichment in uranium 235. This material replaces 100% uranium of 3.30 enrichment. There is also disclosed a nuclear fuel element with the above-described fuel material and a nuclear reactor fueled by such elements.

There is further disclosed wet methods of treating spent nuclear fuel wherein the appropriate quantity of enriched uranium to achieve the desired fissile content is added to the solution of uranium and plutonium after separation from the fission products or to the solution of plutonium alone after separation of the plutonium from the uranium.

7 Claims, 4 Drawing Figures

NUCLEAR FUEL ELEMENT, CORE FOR NUCLEAR REACTOR, NUCLEAR FUEL MATERIAL

BACKGROUND OF THE INVENTION

This invention relates to nuclear fuel material and has particular relationship to such material containing plutonium. The expression nuclear fuel material as used in this application means the nuclear fuel substance itself, such as the substance of which fuel pellets or the like are formed, as distinct from the fuel elements or fuel assemblies, for example, as shown in Sease U.S. Pat. No. 3,778,348 or Stoll U.S. Pat. No. 3,778,885. The expression "nuclear fuel material" means the nuclear fuel particles coating the inner wall of Stoll's fuel elements not the elements themselves.

Plutonium is produced as a by-product to power production in conventional reactors fueled with uranium or with uranium and plutonium. While this invention is applicable to most types of converter reactors (for example, Canadian heavy-water and steam-cooled heavy water reactors, and some species of gas-cooled), this application, in the interest of concreteness, deals with the most common type, the light water reactor (LWR). Fuel discharged from such reactors generally contains about 0.9% plutonium of which about 0.6% is fissile plutonium. This material is reprocessed and can be reused after augmentation with additional fissile material. During reprocessing fission products are removed and usually there is chemical separation of the residual plutonium from the residual uranium. The plutonium is usually recovered in a plutonium nitrate solution, or with some subsequent processing, plutonium oxide powder. Such by-product plutonium either prior to or subsequent to conversion to the oxide or other form is blended with a suitable quantity of uranium, and this mixed fuel, usually mixed oxide, material is subsequently fabricated into suitable fuel elements. Such fuel elements can be reintroduced into the reactor wherein the plutonium was generated during refueling or into other reactors to serve as fuel material, providing the mechanism for fissioning and thereby producing heat. Fast breeder reactors use plutonium as the primary fuel material and during the course of power generation produce more plutonium than is consumed. This excess plutonium, subsequent to reprocessing, can similarly be used as the fuel in other reactors.

Since its discovery, plutonium has been known to be one of the most toxic materials known to man. Stringent control levels have been dictated by government regulatory agencies to minimize risk to processing and fabrication plant personnel as well as to the general public. A maximum body burden for soluble compounds has been set at 0.04 microcuries (about 0.6 micrograms of Pu-239), and the maximum permissible concentration in the breathing atmosphere for 40-hour per week exposure has been set at $2 \times 10^{-12}$ microcuries per cubic centimeter of air if soluble plutonium compounds are involved, and $4 \times 10^{-11}$ microcuries per cubic centimeter, for insoluble compounds. This latter criteria translates into a maximum permissible lung burden of 0.016 microcuries (or 0.26 micrograms of Pu-239). These restrictions have led to a distinctive plutonium processing and fabrication technology characterized by containment structures, semi-remote handling, extensive ventilation precautions to minimize the probability for plutonium to escape from the enclosures to the breathing air, and extensive monitoring to detect escaped plutonium as soon as possible. The associated processing and fabrication of fuel pellets, fuel elements (usually rods), and fuel assemblies for plutonium is considerably more complex and costly than for the sister element uranium.

This has led to the practice, in accordance with the teachings of the prior art, to concentrate as much plutonium as practicable into plutonium reactor fuel rods so that the number of fuel rods required to be fabricated with the use of the costly plutonium technology is minimized. For example, in light water reactors, a fuel rod that is fabricated with plutonium, under prior art practice, consists of natural uranium (0.72% fissile U-235), depleted uranium (0.2 to 0.4% U-235), or recycled uranium from the reprocessing operation (U-235 concentration up to about 1%), with plutonium being added in sufficient quantity to make a useful reactor fuel (total fissile material content between 2.2 and 5%). This is commonly called a U-235 replacement method of plutonium recycle. Within the concentration range dictated by prior art, fissile plutonium (in association with the non-fissile plutonium isotopes normally generated in reactor-produced plutonium) has less reactivity value than U-235, hence for each atom of U-235 displaced, approximately 1.25 fissile atoms of plutonium must be added (together with the associated non-fissile isotopes). More explicitly, if a fuel rod containing only 3.3% enriched uranium is required in a certan reactor core location, this is replaced in accordance with the teachings of the prior art with a mixed-oxide fuel rod that contains natural uranium (0.72% U-235) plus approximately $(3.30-0.72) \times 1.25 = 3.225\%$ fissile plutonium. However, such plutonium addition and U-235 replacement causes local power peaking because with neutron fission cross section of plutonium is higher than that of U-235. Local introduction of plutonium therefore requires modification to surrounding fuel elements or to location of control materials so as to keep power peaking to acceptable levels. Local introduction of plutonium, therefore, requires significant alteration of core design and evaluation of fuel behavior.

Plutonium fuel material in accordance with the teachings of the prior art are, because of the costly processing, handling, and maintenance which they demand, costly. In addition, in reactors containing rods having the relatively high content of plutonium of the prior art there exists a non-uniform spacial distribution of energy generation and, in addition, fuel cycle equilibrium is not attainable in such reactors.

It is an object of this invention to overcome the above-described disadvantages of the prior art and to provide nuclear fuel material including plutonium whose processing, handling, and maintenance cost shall be substantially lower than that of prior-art plutonium-containing fuel material. It is a further object of this invention to provide a method of making such plutonium-containing nuclear fuel material. It is also an object of this invention to provide a nuclear reactor including plutonium-containing nuclear fuel material which shall not manifest the local power peaking of prior-art reactors containing plutonium nuclear fuel and in whose use an equilibrium fuel cycle shall be attainable.

SUMMARY OF THE INVENTION

This invention arises from the realization that, contrary to the views which lead to prior-art practice, the hazards of plutonium processing, handling, and maintenance and the environmental hazards which it creates are materially less with the available plutonium distributed in as small proportions as practicable over the preponderance of nuclear fuel material which serves in reactors than with the available plutonium concentrated in substantial proportions in a few fuel rods or elements. Indeed, wide distribution of the plutonium in small proportions results in procesing, handling, maintenance and environmental problems substantially no more burdensome than the problems presently presented by uranium. It has also been realized that with the plutonium distributed over the preponderance of nuclear fuel material in small proportions, the plutonium can be distributed throughout a reactor precluding local power peaking and permitting the attainment of an equilibrium fuel cycle.

In accordance with this invention plutonium-containing nuclear fuel material is provided whose plutonium content is as small as practicable considering the plutonium available and the demand of nuclear reactors for fuel. To achieve a desired fissile content this nuclear fuel material includes less than 1% of plutonium and the remainder uranium of U-235 enrichment which together with the plutonium is sufficient to attain the required fissile content. Alternatively, the material includes less than 1% plutonium, uranium of modest enrichment (less than 1%) and enriched uranium sufficient to attain the desired fissile content. In accordance with this invention there are also provided a fuel rod or element or assembly containing the above-described nuclear fuel material and a nuclear reactor in which such fuel rods are distributed throughout all regions of the core. In such a reactor local power peaking is suppressed; an equilibrium fuel cycle is attainable. The nuclear fuel material in accordance with this invention is produced during the processing of the spent nuclear fuel of a reactor to derive plutonium. During this processing a solution of spent uranium and plutonium is separated from the fission products. The fuel material according to this invention can be produced at this stage of the process by adding a solution of appropriately enriched uranium to the solution of spent uranium and plutonium in sufficient quantity to achieve the required proportions and fissile content. The fuel material according to this invention may also be produced, at a later stage of the process, by separating the plutonium from the uranium and adding to the plutonium solution a solution of enriched uranium of lower enrichment than for the above solution of uranium and plutonium to achieve the required proportion and fissile content. In each case the solute is precipitated from the solution and typically reduced to a mixed oxide powder of uranium and plutonium from which the fuel is formed.

The concentration of plutonium in the fuel material depends on the plutonium available and the fuel demands. During the period 1976 to 1980 the projected recovery of plutonium from spent fuel, when distributed over all fuel required for projected light-water reactors, would yield a fissile plutonium content of about 0.16% and a total plutonium content of 0.21%. The remainder 99.79% would be all enriched uranium or partly enriched uranium and partly spent uranium. Over the time span, 1981–1995, similar distribution of plutonium (making allowances for plutonium required for contemplated fast breeder fueling) results in the lowest realistic concentration being about 0.42% total plutonium content or 0.29% fissile plutonium content. Discharged nuclear fuel after normal service contains approximately 0.6% fissile plutonium or 0.9% plutonium. This can be considered as an upper level of practicability for the practice of this invention.

BRIEF DESCRIPTION OF THE DRAWINGS

For a better understanding of this invention both as to its organization and as to its method of operation, together with additional objects and advantages thereof, reference is made to the following description, taken in connection with the accompanying drawings, in which:

FIG. 1 shows a nuclear fuel element or rod including a container 1 of stainless steel or ZIRCALOY alloy or the like formed of a cylindrical body to which end caps 2 are welded. Within the container there is a retaining spring 3 and nuclear fuel pellets 4 formed of nuclear fuel material in accordance with this invention. Such material includes less than 1% plutonium and the remainder both enriched and spent uranium or all enriched uranium. The enrichment is sufficient to achieve the desired fissile content for the material.

FIG. 2 predominately shows the core of a reactor R. This reactor includes a core barrel 21 of generally cylindrical section which is surrounded by a pressure vessel (not shown). At the bottom of the core barrel is a lower core plate, a flow mixer plate and core support columns (detail not shown). Fuel assemblies rest on this lower hardware. Coolant flows through inlet nozzles of the pressure vessel down the outside of the core barrel and then up through the fuel assemblies and out through exit nozzles located above the core. From there coolant flow is through heat exchangers where heat is transferred to a non-radioactive coolant for subsequent useable power generation.

Figure 1:
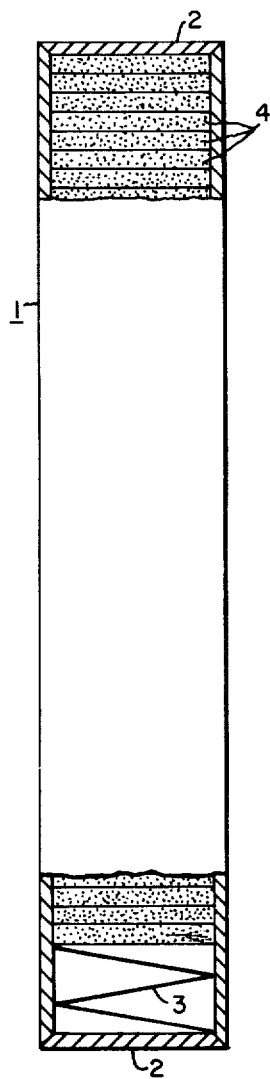
FIG. 1 is a generally diagrammatic view of a nuclear fuel element or rod according to this invention; a cluster of such rods forms a fuel assembly.
Figure 2:
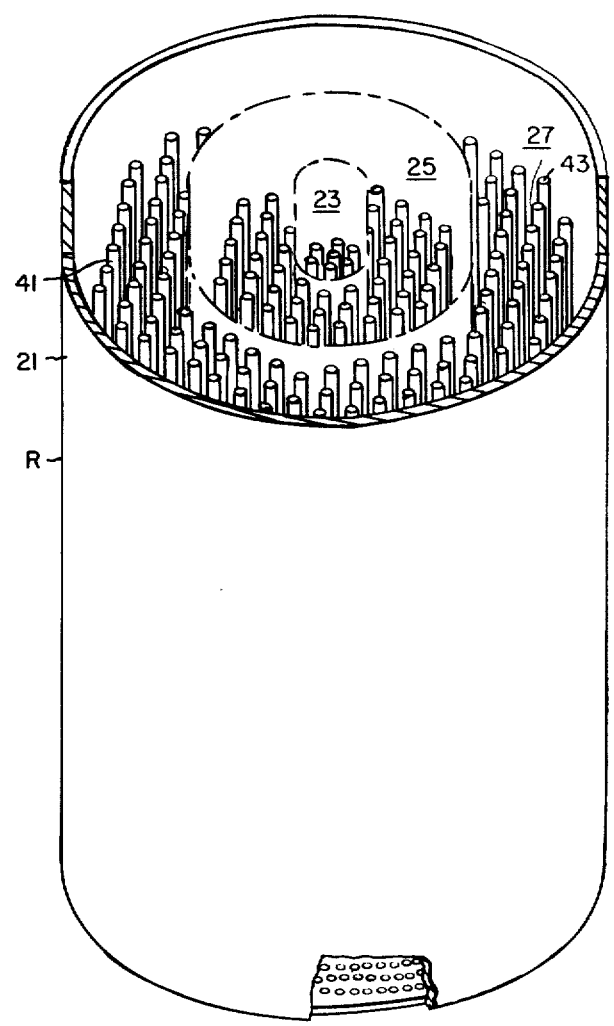
FIG. 2 is a generally diagrammatic view in perspective showing a reactor according to this invention.

The core is subdivided into zones 23, 25, and 27, which zones are defined by the history of fuel assembly loading; for example, zone 27 might contain fresh fuel, zone 25 might contain fuel that has been irradiated for one year, and zone 23, fuel that has been irradiated for two years. Each of the zones 23, 25, and 27 includes a plurality of fuel assemblies 41. Each fuel assembly 41 includes a bundle of fuel elements or rods as shown in FIG. 1. The fuel assemblies 41 in different zones 23, 25, and 27 may have different enrichments but they all include less than 1% of plutonium. This is the equilibrium condition under this invention; however, there is nothing that prevents introduction of the low concentration mixed oxide in one or more fuel assemblies into a core that contains fuel assemblies loaded primarily with uranium. The starting material for producing the mixed fuel, typically mixed-oxide fuel (there may also be alloy or mixed carbide fuel) is the spent fuel from a nuclear reactor. After irradiation (and heat production) for a period of approximately three years, the fuel material within the fuel assemblies consists of residual uranium, enriched to approximately 0.9% U-235; residual plutonium and plutonium produced by neutron absorption in U-238; and fission products. After such irradiation, the fuel assemblies are removed from the reactor and treated in a reprocessing plant for removal of the fission products and for separation and recovery of the uranium and plutonium.

Extraneous hardware is removed from the fuel assemblies and the fuel rods are chopped to expose the ceramic oxide fuel material. The fuel material is separated from the metal (generally Zircaloy) through dissolution in nitric acid solution. Following dissolution, the three components, uranium, plutonium and fission products, are separated and purified through a series of solvent extraction steps, or through solvent extraction and ion exchange processing.

The more conventional process is the Purex process. In this process the $HNO_3$ feed solution derived from dissolution of the material, adjusted to proper acidity, along with aqueous recycle solutions, is contacted with tributyl phosphate (TBP) in a kerosene-type diluent within an extraction column. The aqueous raffinate, containing most of the fission products, is sent to acid recovery, while the organic phase, containing the plutonium and uranium, is scrubbed in another column to obtain further decontamination from the fission products. The aqueous solution from this second column is recycled back to the first column, while the organic phase is stripped with aqueous ferrous sulfamate in a third column to remove plutonium from the uranium. However, this aqueous plutonium stream still contains appreciable uranium and, therefore, is again scrubbed in another column, after which the organic stream that contains the uranium is recycled to the first column, while the aqueous plutonium stream, now relatively free of uranium, is heated to about 55° C. and treated with $NaNO_2$ to destroy sulfamate and to oxidize the plutonium to the tetravalent state. The resulting solution is sent to another column for additional TBP extraction with the aqueous raffinate being recycled. The organic phase that contains the plutonium is stripped with dilute $HNO_3$-$H_2SO_4$ in another column and the stripped organic is sent to organic recovery. The aqueous product, containing 0.1 to 1.0 grams of plutonium per liter is treated with $HNO_3$ to increase the nitrate concentration to a value favoring formation of plutonium anionic complexes. The resulting solution is concentrated by anion exchange. The plutonium is adsorbed on the resin in a column and washed with $HNO_3$ solution. The aqueous eluate contains 10 to 50 grams of plutonium per liter and further concentration to about 200 grams per liter is achieved by evaporation.

The uranium-containing organic stream from a previous column is stripped with very dilute $HNO_3$ in another column and the resulting aqueous phase is concentrated by boiling and treated with ferrous sulfamate solution to reduce any remaining plutonium to the inextractable trivalent state. The resulting solution is extracted with TBP in another column and the organic phase is scrubbed with $HNO_3$ and water. The aqueous stream containing some residual plutonium is backcycled, while the product uranium stream is further concentrated. The Purex process yields two product streams, nitric acid solutions that contain relatively pure uranium and pure plutonium.

In the conventional and most economic process, the recovered uranyl nitrate in solution is converted to $UF_6$ and sent to the gaseous diffusion complex for reenriching.

Under prior-art practice the plutonium nitrate in solution is precipitated by the addition of peroxide or oxalic acid, for example, and the resulting intermediate is calcined to the oxide, $PuO_2$. This then is blended with natural uranium $UO_2$ powder to provide feed material of suitable composition for fuel fabrication. The plutonium nitrate solution can also be added to natural uranium nitrate solution and the two constituents can be coprecipitated, for example, by the standard ammonium diuranate process described below, followed by reduction to the mixed oxide, $(U,Pu)O_2$.

Under the most economic practice of this invention, enriched uranium typically containing about 3% U-235 is received from the gaseous diffusion complex as $UF_6$. The $UF_6$ is hydrolized and the resulting solution blended with the plutonium nitrate solution recovered from the reprocessing operation, with such blending being in appropriate proportion to yield the desired material composition for fuel fabrication. Ammonia is then added to yield the precipitation of ADU and plutonium hydroxide, $(NH_4)_2U_2O_7$ and $Pu(OH)_4$. The filtrate is then washed and dried and reduced in a hydrogen atmosphere to yield the product, $(U,Pu)O_2$.

In accordance with a further aspect to this invention, the uranium is not separated from the plutonium during reprocessing but the combined stream is blended in the required proportions with a solution of enriched uranium. The enrichment of this uranium necessary to achieve the required fissile content is higher than in the treatment of pure plutonium in the practice of this invention because of the presence in the stream of spent uranium. Typically, the enrichment of the uranium may be higher than 4% where about 3% enrichment is used with the pure plutonium. This material can then be coprecipitated as above and reduced to the product, $(U,Pu)O_2$.

The desired fuel material under this invention can also be made by mixing the component oxide powders; all benefits will accrue except the health benefit related to hot particles and the safeguards benefit prior to blending.

Following powder preparation, fuel fabrication proceeds as under prior art except that such operations can be carried out in uranium facilities rather than in the complex plutonium facilities because of the lower hazard associated with the low concentration mixed-oxide. Process steps involved include: slugging, granulating, pellet pressing, sintering, centerless grinding, pellet inspection, fuel rod loading, end-cap welding and final rod inspection.

The nuclear fuel material according to this invention leads to the following advantages:

1. The modest quantity of fissile plutonium added (permitting corresponding U-235 decrease) to the enriched uranium fuel has only a small effect upon reactor neutronics. Local power peaking is slightly affected, but the perturbation is uniform since small quantities of plutonium are distributed throughout all fuel elements 11. Also, the neutron spectrum is not significantly hardened as is the situation in prior art practice. The present reactor designs in which uranium fuel of small enrichment is included can be used with the only modification that the plutonium is added and a corresponding quantity of U-235 is subtracted.

2. Under prior-art practice with plutonium recycle, an equilibrium fuel cycle is unattainable. Available plutonium isotopic compositions change with time and therefore extensive in-core fuel management and fuel design calculations must be performed prior to each refueling. In the practice of this invention, the modest quantity of plutonium added locally has such little effect that the overall reactor core performance is insensitive to changes in plutonium isotopic composition. Equilibrium fuel cycles are attainable and the extensive fuel design and fuel management calculations can be largely eliminated; certainly, they can be reduced to those required for safe operation under pure uranium fueling.

3. Under prior art practice, the reactivity value of fissile plutonium (in association with the non-fissile isotopes present in reactor-produced plutonium) relative to U-235 is about 1/1.25. In the practice of this invention, the relative plutonium worth is increased due primarily to the softened neutron spectrum; consequently, the relative effectiveness becomes about 1/1.18. Obviously, these ratios and the effect of this invention will vary somewhat depending upon type of reactor, boiling water or pressurized water, and plutonium isotopic composition. However, the percentage improvement for all situations is expected to be at least as large as indicated. Another way of stating this result is that in the practice of this invention 118 atoms of plutonium can do the work of 125 under prior-art practice; plutonium value is therefore increased by about 6%.

Figure 3:
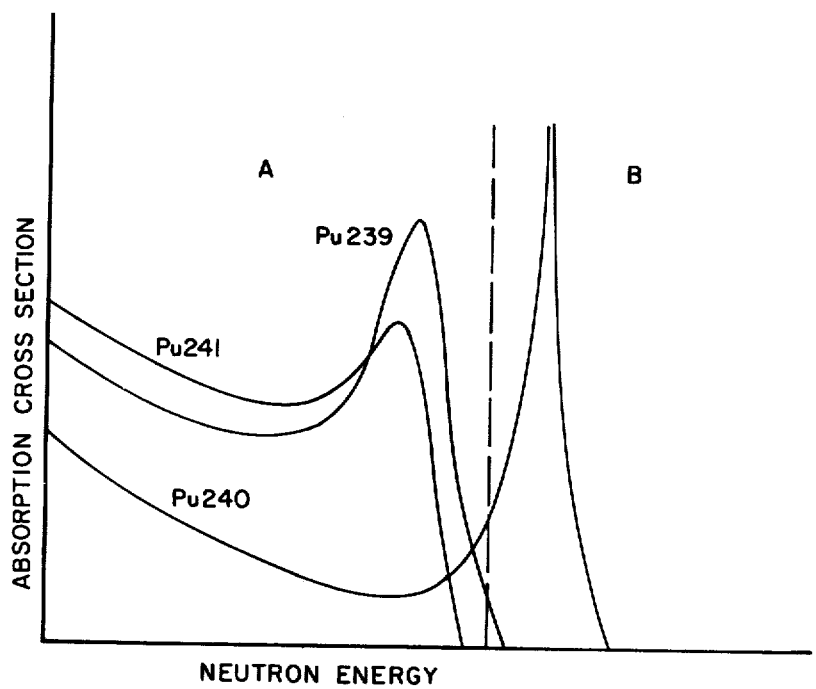
FIGS. 3 and 4 are graphs illustrating certain advantages of this invention.

How this improvement is achieved is illustrated in FIG. 3 in which absorption cross section is plotted as ordinate and neutron energy as abscissa. The neutron energy increases to the right being high in the area labeled B and low in the area labeled A. In FIG. 3 plots are presented showing the absorption cross section as a function of the neutron energy for the principal isotopes Pu-239, Pu-240, Pu-241 of plutonium. Pu-240 which is non-fissionable has a peak in the high-energy range B but has low absorption in the area A. In prior-art reactors a significant number of neutrons are absorbed in area B while under practice of this invention such absorptions are considerably reduced. Relatively more neutrons are then absorbed in Pu-240 without producing fission in prior-art practice while relatively more neutrons are absorbed by Pu-239 and Pu-241, the fissionable isotopes, producing fission in the practice of this invention. This accounts for the improvement in the ratio of plutonium effectiveness to uranium effectiveness.

Figure 4:
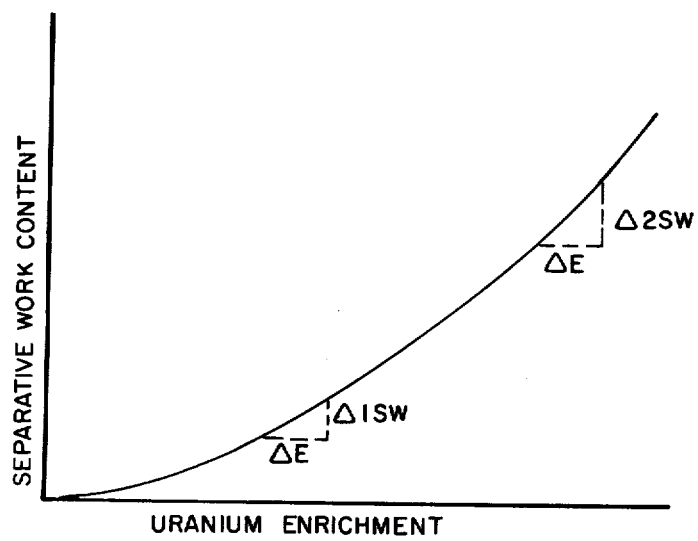

4. In the practice of this invention, plutonium value is further increased because it is used to replace U-235 having higher separative work content than under prior-art practice. For example, compare replacing a uranium fuel material having 3.3% enrichment with equivalent prior-art mixed-oxide fuel material with material dictated by this invention. Under prior-art practice, assuming mixing of plutonium with natural uranium, the U-235 content is reduced from 3.3% to 0.72%, or the average replaced U-235 atom is at an enrichment of about 2%. Pursuant to this invention, the U-235 content is reduced from 3.3% to about 3.1% or the average replaced U-235 atom has an enrichment of about 3.2%. The separative work content at 3.2% is significantly greater than the separative work content at 2%. This is illustrated in FIG. 4 which shows the separative work, as ordinate, as a function of enrichment as abscissa. The separative work Δ2SW for a change of enrichment ΔE at higher enrichment is greater than Δ1SW for the same change of enrichment ΔE at lower enrichment. Pursuant to this invention, plutonium replaces material of higher value; therefore, in effect, plutonium used in the prescribed manner has higher value.

The total monetary impact in this regard can be more precisely ascertained through comparison of equivalent materials costs based upon specific unit cost assumptions. Consider again the three equivalent fuel materials but for this analysis let us be more precise as to the practice of this invention. Consider the 1976–1980 time frame wherein the lowest practicable fissile plutonium concentration is expected to be about 0.16%. Further, let the plutonium effectiveness ratio relative to U-235 be 1.18. Table I below shows the materials contents of the three equivalent fuel materials in percent of heavy atoms:

TABLE I

|  | Uranium Only | Prior Art Pu Recycle | This Invention Pu Recycle |
|---|---|---|---|
| U-235 Content | 3.30 | 0.689 | 3.164 |
| U-238 Content* | 96.70 | 94.953 | 96.620 |
| Uranium Enrichment | 3.30 | 0.72 | 3.171 |
| Fissile Pu Content | 0 | 3.225 | 0.160 |
| Total Pu Content | 0 | 4.358 | 0.216 |

*Including other uranium isotopes not germaine to this discussion. Table II Shows the cost analysis of these three fuel rods, in each case, for 1 kilogram of total fuel material.

TABLE II

|  |  |  |  |
|---|---|---|---|
| Assumed Cost of Natural UF$_6$, $/kg Feed/Product | 24.00 | 21.50** | 24.00 |
| Required @ 0.3% Tails*** | 7.299 | 1.00 | 6.986 |
| Cost of Feed per Kg of U Product, $ | 175.18 | 21.50 | 167.66 |
| Assumed Cost of Separative Work, $/kg | 50.00 | — | 50.00 |
| Separative Work required @ 0.3% Tails | 3.970 | 0 | 3.734 |
| Cost of SW per Kg of U Product, $ | 198.50 | 0 | 186.70 |
| Cost per Kg U, $ | 373.68 | 21.50 | 354.36 |
| Cost of U Required, $ | 373.68 | 20.56 | 353.59 |
| Δ Cost from U Rod, $ | — | 353.12 | 20.09 |
| Fissile Pu Content, gm | 0 | 32.25 | 1.6 |
| Pu Value, $/gm Pu$_F$ | — | 10.95 | 12.56 |

**$24.00 less UF$_6$ conversion cost which is not required.
***Material lost in uranium isotope separation.

It is seen that in the practice of this invention, the neutronic and separative work value of fissile plutonium can be increased over present art from $10.95 to $12.56 per gram, an increase of about 15%.

5. In the practice of this invention, to make a specific amount of fuel material requires less natural uranium feed than under current practice; consequently, natural resources or energy reserves can be extended. The magnitude of such savings can be ascertained from the information provided in the previous table. Therein, it was indicated that 7.299 kg of natural uranium feed are required to produce 1 kg of uranium-only fuel material. Under the proposed method of recycle, 6.986×0.99784=6.971 kg of natural uranium feed (in conjunction with 1.6 gm Pu$_F$) are required. Therefore, the use of 1.6 gm Pu$_F$ reduces natural uranium requirements by 7.299−6.971=0.328 kg; or 1 gm Pu$_F$ is equivalent to 0.205 kg of natural uranium.

Similar analysis with respect to current practice shows that 0.95642 kg of natural uranium (in conjunction with 32.25 gm Pu$_F$) is required to produce 1 kg of equivalent fuel material. Therefore, the use of 32.25 gm Pu$_F$ reduces natural uranium requiremments by 7.299−0.95642=6.34258 kg; or 1 gm Pu$_F$ is equivalent to 0.197 kg of natural uranium. Consequently, the proposed method of recycle increases the natural uranium equivalency of fissile plutonium by about 4%, thereby extending uranium reserves.

6. Processing and fabrication of mixed-oxide fuel, after the precipitate from the uranium-plutonium solution is obtained, under prior-art practice is undertaken in complex facilities specifically designed to handle plutonium in a safe manner, escaping or reducing its hazards. In the distribution of plutonium in small proportions throughout all nuclear fuel, the fuel fabrication procedures are simplified and their cost reduced.

To evaluate the type of processing and fabrication technology suited for a particular radioactive material requires knowledge of the radioactive hazard or activity levels relative to other radioactive materials commonly processed. In the case of plutonium-bearing materials, the hazard is one of inhalation since alpha decay is the dominant decay mode. This suggests that an appropriate comparison is relative to the processing of uranium. It should be further recognized that under the practice of this invention, one is concerned primarily with the insoluble oxide and that plutonium shortly after recovery becomes only a minor component of a basically uranium system, mixed oxide. Cursory examination of the hazard potential of plutonium relative to uranium can be made by comparison of the maximum permissible air concentrations, $(MPC)_a$, for soluble compounds. These limits for 40-hour per week exposure are $2 \times 10^{-12}$ microcuries/cc of air for Pu-239 and $5 \times 10^{-10}$ microcuries/cc of air for U-235. Converting these limits to mass quantities requires only the use of specific activities: $6.17 \times 10^{-2}$ Ci/gm (Curies per gram) for Pu-239 and $2.15 \times 10^{-6}$ Ci/gm for U-235. Such conversion yields $(MPC)_a$ values of $3.24 \times 10^{-11}$ micrograms/cc for Pu-239 and $2.33 \times 10^{-4}$ micrograms/cc for U-235. Therefore, on a mass basis, it is seen that Pu-239 has the potential of being 7 million times more hazardous than U-235. One gram of plutonium is potentially more hazardous than a ton of highly enriched uranium. It is precisely this generalized comparison that led to the complex and unique plutonium technology.

Recognizing that in the practice of this invention mixed oxide is involved, a comparison of relative hazard can be made using the currently accepted maximum permissible lung burdens. For plutonium this burden is 0.016 microcuries; if only Pu-239 is present this burden becomes 0.259 micrograms. For uranium processing, the lung burden is expressed in terms of U-235 mass so that it is essentially independent of the enrichment of uranium being processed and includes the hazard of the associated U-234; this maximum permissible lung burden is 250 micrograms of U-235. The ratio of these mass limits shows that Pu-239 is 965 times more toxic than U-235, or one gram of Pu-239 has the same toxicity as 965 grams of U-235. Therefore, a kilogram of highly enriched uranium has toxicity equal to a one kilogram mass of relatively inactive material that contains about one gram, or 0.1%, Pu-239. It is pointed out that such material is not far different from the mixed-oxide composition prescribed by this invention. Consequently, to process and fabricate material of this degree of toxicity requires highly enriched uranium technology (sans the criticality control aspects) and not pure plutonium technology.

Since in the practice of this invention, plutonium having different isotopic compositions and not pure Pu-239 is involved, a more precise comparison of relative toxicity is warranted. The specific activities of plutonium relative to uranium are compared, using as a basis isotopic compositions expected to be utilized. For plutonium produced in the 1970's, isotopic compositions consistent with irradiation to 23,000 MWD/MTU (Megawatt Days per Metric Ton of Uranium) are used; for plutonium produced in the 1980's, the average exposure level is taken to be 31,000 MWD/MTU. For simplicity of comparison, plutonium concentrations in mixed oxide are taken at the maximum practicable dilution levels; i.e., 0.21% total Pu Content during the 1970's and 0.42% total Pu content during the 1980's. The effect of higher concentrations (as might arise if one were to use uranium and plutonium not separated during reprocessing) or lower concentrations (as might arise due to peculiar circumstances relating to materials availability or processing plant conditions) can be readily obtained by scaling the derived results. The following Table III shows the relative toxicity of these materials of interest:

TABLE III

| Eclative Toxicity of Materials on Equal Mass Basis (uranium of various enrichments and mixed oxides) | | | | |
|---|---|---|---|---|
| | Natural U | 3% U | 95% U | 1970's MO | 1980's MO |
| Natural U | — | 0.35 | 0.013 | 0.0016 | 0.00056 |
| 3% U | 2.9 | — | 0.038 | 0.0044 | 0.0016 |
| 95% U | 75 | 26 | — | 0.115 | 0.041 |
| 1070's MO | 642 | 227 | 8.7 | — | 0.36 |
| 1980's MO | 1800 | 635 | 24.5 | 2.8 | — |

In Table III the toxicity value given at any position in a column is the value of the material heading the row at that position relative to the value of the material heading the column.

Table III shows that the toxicity of 1970's MO is expected to be about 8.7 times that of highly enriched uranium; somewhat more toxic than the 0.1% Pu-239 material used in the previous comparison. Also note that this toxicity level is expected to increase to 24.5 by a factor of 2.8 going into the 1980's.

As bearing on the significance of these increased toxicity levels it is noted that highly enriched uranium is 26 times more toxic than 3% enriched uranium. Until relatively recently such highly enriched uranium was processed under conditions and health and safety controls nearly identical to those employed with slightly enriched uranium. Now some degree of containment is provided, but such containment is not absolute, as in a plutonium plant, and equipment maintenance is performed in the open, not within glove boxes as is the case with plutonium. In short, a toxicity increase by a factor of 26 has been accommodated by modest equipment additions and process modifications. Based upon this experience it is expected that further increases of toxicity levels, by factors of 8-25 or so, can be similarly accommodated without the necessity of going to the extremes associated with handling pure plutonium. Based upon this analysis, it is concluded that it is possible to process and fabricate mixed nuclear fuel, typically mixed oxide fuel, of composition prescribed by this invention, in the present facilities used for the processing and fabrication of slightly enriched uranium fuel with only minor additions to the degree of containment.

The use of low concentration plutonium in mixed-fuel (oxide) has additional beneficial effects. High exposure plutonium, as produced in light water reactors has associated with it significant gamma radiation and neutrons. External exposure to this radiation is therefore a health and handling problem under prior-art practice. Dilution with uranium, as prescribed by this invention, reduces the volumetric source strength of this gamma and neutron radiation, and introduces self-shielding and thereby significantly reduces or completely eliminates gamma and neutron shielding requirements.

In the practice of this invention, the addition of small quantities of plutonium to slightly enriched uranium has insignificant effect on nuclear criticality safety. Accordingly, equipment sized for use with slightly enriched uranium is also criticality safe for the processing of mixed fuel.

In summary, it is concluded that mixed fuel of the prescribed composition can be processed and fabricated into fuel, usually mixed-oxide fuel, in conventional plants designed for use with slightly enriched (up to 5%) uranium. It must be recognized that the mixed fuel is somewhat more toxic than uranium fuel and appropriate precautions must be instituted; also there is need for some additional containment provisions such as are currently provided for use with highly enriched uranium. Such features result in a small increase in the cost of fuel fabrication. Even though fabrication of all nuclear fuel will be penalized by this cost differential, the total industry fabrication burden due to the introduction of plutonium recycle is less than the penalty that would accrue under prior-art practice through the utilization of complex plutonium technology for approximately 10% of the total fuel fabrication industry.

7. During fuel materials processing and fuel fabrication, waste materials are generated and these wastes are somewhat radioactive because of residual fuel material content. Under prior art, significant costs are incurred for waste treatment, ultimate disposal and perpetual surveillance. Under practice of this invention, such processing and associated costs can be largely eliminated since the radioactivity of generated waste will be comparable to that of radioactive ores. Waste treatment and disposal requirements can be assessed by taking cognizance of the experience with the processing of pure plutonium compounds. Such experience indicates that low level solid waste generally contains a few grams of plutonium per 100 lbs. of bulk waste generated. Under the proposed method of recycle, it is expected that similar wastes will contain a few grams of mixed oxide per 100 lbs. of bulk waste. Using 2 grams/100 lbs. as a reasonable average and considering the anticipated 1981-1995 composition of mixed oxide (0.42% total plutonium content having alpha activity of about 0.3 Ci/gm Pu$_T$) yields an alpha activity level in such waste of about $50 \times 10^{-9}$ Ci (50 nanocuries) per gram of bulk waste. Further dilution with only five times the quantity of inert material will reduce the activity level to below 10 nanocuries/gm, the current disposal limit.

8. The health and safety analysis presented under (6) above, was based upon comparison of uranium and mixed oxide specific activities and maximum permissible lung burdens. While such is a valid comparison based upon current regulations and the majority of radiological health opinion, recently there has been increased concern by some professional experts relative to the "hot particle" concept. ("Plutonium Inhalation: The Burden of Negligible Consequence" by A. B. Long, Nuclear News, June 1971, pp. 69-73; "Radiation Standards for Hot Particles" by A. R. Tamplin and T. B. Cochran, Feb. 14, 1974, National Resources Defense Council report; "An Analysis of the Carcinogenic Risk from an Insoluble Alpha-Emitting Aerosol Deposited in Deep Respiratory Tissue" by D. P. Geesaman, 1968, UCRL-50387 and UCRL-50387 Addendum.) This has resulted in a petition to the Environmental Protection Agency and the Atomic Energy Commission that radiation standards relative to hot particles of plutonium be reduced by a factor of 115,000. (This petition by the National Resources Defense Council, Inc. is based upon the Tamplin and Cochran report cited above.) While such theoretical considerations are not supported by experimental evidence ("A Proposed Interim Standard for Plutonium in Soils" by J. W. Healy, Jan. 1974, LA-5483-MS; "A Twenty-Seven Year Study of Selected Los Alamos Plutonium Workers" by L. H. Hempelmann, G. R. Richmond, and G. L. Voelz, Jan. 1973, LA-5148-MS), the concern on the part of some professionals cannot be ignored; the potential public reaction to this debate is unpredictable and therefore adds a degree of uncertainty relative to plutonium utilization under prior art.

Through the practice of this invention, hot particles of plutonium are practically eliminated. This can be readily shown by using only the data presented in the article by Tamplin and Cochran (the severest critics) and their cited references. On page 40 of their report, they state:

"Of the particles of an inhaled aerosol that are deposited in the deep respiratory zone of the lung, virtually all are less than 5 microns in diameter (Geesaman, UCRL-50387, p 3). A 5 micron droplet from the 40 g/liter solution would correspond roughly to the limiting activity of a hot particle. In other words, the particles involved in this study do not qualify as hot particles."

"This study" in the quotation refers to the "Twenty-seven Year Study of Selected Los Alamos Workers." It is pointed out that these workers were primarily exposed during the processing of plutonium nitrate solution containing no uranium dilution. Consequently, Tamplin and Cochran conclude that the petition to reduce radiation standards by a factor of 115,000 need not be applied to such processing operations. Accordingly, during operations associated with conversion of plutonium nitrate solution (the reprocessing plant output) to mixed oxide, one need not be concerned with the hot particle problem except as it might apply to the product mixed fuel particles.

With regard to the mixed fuel particles, it should be noted from the above quotation that Tamplin and Cochran admit that particles of size greater than 5 microns are of no consequence to the hot particle discussion, no matter what their activity level, since such particles are not retained in the lung. Further, on page 34 of their report they state:

"As seen from Table IV, using Geesaman's lung model, a particle with an alpha activity between 0.02 pCi (pica Curie) and 0.14 pCi is required to give a dose of 1000 rem/yr to irradiated lung tissue. For purposes of establishing a maximum permissible lung particle burden we will use 0.07 pCi from long half-lived (greater than one year) isotopes as the limiting alpha activity to qualify as a hot particle. Thus, throughout the remainder of this report, hot particle will imply a particle with at least this limiting alpha activity which is insoluble in lung tissue."

The mixed fuel, mixed oxide, of minimum practicable plutonium content in the 1976-1980 time frame as prescribed by this invention, contains about 0.21% total plutonium. The specific alpha activity of this plutonium (having anticipated isotopic composition of 0.7% Pu-238, 63.7% Pu-239, 22.2% Pu-240, 10.8% Pu-241, and 2.6% Pu-242) is about 0.21 Ci/gm Pu$_T$. Mixed oxide containing only 0.21% plutonium, therefore, has specific activity of $4.4 \times 10^{-4}$ Ci/gm of uranium and plutonium or $3.9 \times 10^{-4}$ Ci/gm of mixed fuel (the oxide). A 5 micron diameter particle of mixed fuel (density of about 10 gm/cc), consequently has activity of $0.25 \times 10^{-12}$ Ci = 0.25 pCi. Accounting for alpha self-shielding within the particle yields an effective activity of 0.23 pCi. It is seen that this is 0.23/0.14 = 1.6 times greater than Tamplin's and Cochran's hot particle limit. Looking at this another way, a mixed oxide particle having diameter of 4.3 microns has effective activity of 0.14 pCi. Since Tamplin and Cochran state, in the above quotation, an uncertainty range on the particle activity limit of a factor of 7, from these results (within a factor of 1.6 of their upper limit), it can be concluded that mixed oxide of the composition prescribed by this invention satisfies the criteria set forth by Tamplin and Cochran. Only a small fraction of all particles potentially produced can have activities of sufficient magnitude to qualify as hot particles and the maximum activity of such particles is not far above the error band ascribed by theoretical considerations.

9. Consideration should be given to the fact that plutonium, under present art, is recovered from reprocessing plants in pure form as plutonium nitrate solution and that somehow this plutonium must be diluted with uranium to arrive at the mixed fuel compositions according to this invention.

Most of the discussion and conclusions presented under (6) above are also applicable to this aspect of processing. Similar conversion plants to convert from uranyl-nitrate or UF$_6$ to oxide are used both for the conversion of highly enriched uranium as well as slightly enriched (up to 5%) uranium. The only differences are in size (due to criticality safety aspects) and containment provisions. Since criticality safety relative to the material compositions of interest under this invention is essentially identical to that applicable to slightly enriched uranium, size need not be altered, but suitable containment need be provided. Also, modifications must be made to allow appropriate introduction of the plutonium. For either the wet or dry conversion process such introduction is relatively straightforward.

In the light of the "hot particle" discussion presented under (7) above, the practice of this invention requires coprecipitation or other direct production of the mixed fuel if the ultimate radiological safety benefits are to be derived. Blending of UO$_2$ and PuO$_2$ powders, for example, would reduce the probability of excessive plutonium inhalation because of the dilution with uranium, but could still result in the inhalation of hot particles of plutonium. Consequently, it is reasonable to inquire whether separation of the plutonium from the uranium is warranted during the reprocessing operation.

For this analysis, a cost comparison similar to that presented under (4) above is appropriate; by comparing the costs associated with various processing alternatives relative to the cost of equivalent slightly enriched uranium (taken to be 3.3%), one can arrive at the value of fissile plutonium for all cases considered. Taking as an example the typical spent fuel characteristics expected to pertain in the late 1970's (96% of initial heavy atoms in fuel are recovered; recoverable uranium enrichment is 0.90%; total plutonium content is 0.80% of which 74% is fissile), one arrives at the following results when using the unit costs given in (4) above:

(a) Separate Pu from U and provide sufficient natural uranium so that mixing the available plutonium yields a mixed oxide composition under prior art, taking credit for the value of recovered uranium feed to the enrichment plant. The derived plutonium value is \$10.95/gm Pu$_F$.

(b) Perform no separation but to each 960 grams of recovered material add 50 grams of uranium enriched to 40.05% (the minimum quantity of uranium that can be added to provide a useful fuel taking into account a 1% materials loss during subsequent fuel fabrication). The derived plutonium value is \$2.86/gm Pu$_F$.

(c) Separate Pu from U and make material of identical composition to (b) by using recovered uranium as feed to the enrichment plant and adding to the recovered plutonium, uranium enriched to 2.853%. The derived plutonium value is \$12.25/gm Pu$_F$.

(d) Perform no separation but to each 960 grams of recovered material add 2590 grams of uranium enriched to 4.01% (the maximum quantity of uranium that can be added to provide a useful fuel (containing 0.16% Pu$_F$) in the 1976–1980 time frame under practice of this invention). The derived plutonium value is \$7.02/gm Pu$_F$.

(e) Separate Pu from U and make material of identical composition to (d) by using recovered uranium as feed to the enrichment plant and adding to the recovered plutonium, uranium enriched to 3.171%. The derived plutonium value is \$12.56/gm Pu$_F$.

It is seen that not separating the plutonium from the uranium during reprocessing operations has significant cost impact as indicated by the reduced plutonium values. Case (b) shows a plutonium value reduction of \$9.39/gm Pu$_F$ relative to case (c). Since reprocessing of one kilogram of spent fuel allows recovery of 5.67 gm Pu$_F$ under the basis used in the analysis, this difference translates into a cost penalty of \$53.34/kg of spent fuel. Under practice of this invention to the maximum dilution practicable in the 1976–1980 time period, the cost penalty is still appreciable but not nearly as severe. The difference in plutonium value between cases (d) and (e) is \$5.54/gm Pu$_F$. Translation yields a penalty of \$31.47/kg of spent fuel. The cost penalty of case (d) compared to present art, case (a), is only \$3.93/gm Pu$_F$, or a plutonium value reduction of about 36%. On a kilogram of spent fuel basis, this translates in \$22.32/kg.

From this analysis it is concluded that separation of plutonium from uranium during reprocessing is to be preferred based on economic considerations both under prior-art practice and under practice of this invention.

10. Under current practice, mixed oxide is prepared primarily by the blending of UO$_2$ and PuO$_2$ powders in required proportion. Consequently, islands of PuO$_2$ can exist and these are difficult to dissolve during reprocessing. This more difficult dissolution is expected to increase the cost of reprocessing mixed oxide fuel relative to uranium fuel by at least \$5 per kg of spent fuel. Under the proposed scheme with mixed oxide being produced by coprecipitation of the constituents (and further since plutonium is such a minor constituent), the dissolution rate is essentially identical to that of pure UO$_2$. Accordingly, the dissolution penalty need not be incurred. Since under current practice each kilogram of mixed oxide fuel contains approximately 32 gm Pu$_F$, the dissolution penalty is at least \$0.16/gm Pu$_F$. Therefore, under the proposed recycle scheme, the value of fissile plutonium is increased by this amount.

11. Since nuclear weapons are made primarily with plutonium (or highly enriched uranium), there is great public concern concerning diversion of this material from the fuel chain and subsequent clandestine fabrication of a nuclear device both by individuals and by nations. Such concern has led to regulation of elaborate safeguards procedures and such are expected to be further upgraded. Through the use of mixed fuel of compositions prescribed by this invention, fabrication of a nuclear device is made so difficult that diversion of sufficient material to make an unsophisticated nuclear device becomes highly unlikely and improbable. Therefore, the costs associated with safeguards under prior-art practice can, for the most part, be saved.

As a reference point, the minimum critical mass of normal-density plutonium metal is about 5 kilograms. The minimum practicable concentration of plutonium in mixed oxide according to this invention in the 1976–1980 time frame, yields 2.1 kilograms of total plutonium in one metric ton of mixed oxide. In other words, to recover sufficient plutonium to make an unsophisticated nuclear device requires processing of the order of tons of mixed oxide. Specifically, what is required is solvent extraction or ion exchange capability to separate the plutonium from the uranium. Such equipment must be capable of processing tonnage quantities of mixed oxide. After recovery the plutonium must be converted to the oxalate, or similar intermediate compound, and then to oxide. Subsequent treatment requires conversion to PuF$_4$ and bomb reduction to plutonium metal. It is inconceivable that a terrorist organization can make preparations for such extensive processing, can divert the necessary tonnage quantities of material, and can subsequently perform the processing and carry out the device fabrication. Such a project would require years of planning and effort and millions of dollars of expenditures together with the availability of highly competent technical talent. It is not reasonable to assume that such a project would be undertaken and would remain undetected.

In the practice of this invention, after fuel fabrication, one pressurized-water reactor fuel assembly contains only about one kilogram of plutonium and one boiling-water reactor fuel assembly contains only about 400 grams. Diversion of massive pieces of hardware would be necessary to obtain sufficient contained plutonium.

The only portion of the fuel cycle wherein concern for diversion would not be unreasonable would be at the end of the reprocessing operation where plutonium nitrate solution is available in relatively pure form. This could be totally eliminated by paying the economic penalty associated with no uranium/plutonium separation as indicated in (9) above. Such reprocessing without separation for the purposes of safeguards is also covered by this invention since, in the practice of this invention, the economic penalty is substantially reduced. In lieu of going to this safeguards extreme, the immediate dilution of plutonium nitrate solution with enriched uranyl-nitrate to the extent prescribed by this invention can be required. The safeguards concern would then be limited to a sepcific portion of the reprocessing plant and adequate safeguards could be provided at relatively low cost.

In summary, in accordance with this invention, plutonium derived from converter or breeder reactors is used in converter reactors in conjunction with uranium at a plutonium concentration that is as low as practicable, less than 1%. By using fuel of such composition:

1. Fuel elements, fuel assemblies and reactor core designs developed for slightly enriched uranium fuel are fully applicable except for the change in fuel materials composition.

2. It is possible to achieve equilibrium fuel cycles, thereby eliminating the necessity for extensive fuel design and fuel management calculations prior to each and every fuel cycle.

3. Each fissile atom of plutonium utilized has greater neutronic value than under prior-art practice because of the softened neutron spectrum.

4. Each fissile atom of plutonium utilized has greater separative work value than under prior art because it replaces a U-235 atom of greater separative work content.

5. As a consequence of (4), plutonium is equivalent to about 4% more natural uranium than under current practice. Accordingly, natural resources or energy reserves of uranium are extended by this amount.

6. Processing, from the point of dilution of plutonium with uranium, and fuel fabrication can be undertaken using technology developed for slightly enriched uranium with modest addition of containment provisions (as is one in the processing and fabrication of highly enriched uranium fuel), rather than in facilities specifically designed to handle plutonium as is the case under prior-art practice.

7. Waste treatment and the associated concerns for ultimate disposal and perpetual surveillance are largely eliminated since waste activity levels will be comparable to those of radioactive ore.

8. Concern relative to hot particles is largely eliminated since few hot particles are produced.

9. Dissolution of mixed oxide during reprocessing will present no difficulty and, accordingly, reprocessing cost savings will accrue relative to current practice.

10. Fear relative to safeguards can be largely allayed or can be essentially eliminated by the further requirement that recovered plutonium never be separated from recovered uranium; under which requirement this invention can still be practiced while such is not possible under prior-art practice, unless pure plutonium can be obtained from somewhere, which would negate the safeguards criteria.

While preferred embodiments of this invention are disclosed herein, many modifications thereof are feasible. This invention is not to be restricted except insofar as is necessitated by the spirit of the prior art.

I claim:

1. A homogeneous nuclear fuel material of a predetermined fissile content for replacing enriched uranium necessary for satisfactory reactor operation, said material consisting of recycled plutonium and uranium as nuclear reactive components, wherein said plutonium content is as small as practicable considering reactor demand, said plutonium content being less than 1% and the remainder being uranium, said material containing sufficient uranium of 235 enrichment which, when combined with the recycled plutonium, gives said material said predetermined fissile content.

2. The nuclear fuel material of claim 1 wherein the total uranium content is derived from uranium of a single uranium 235 enrichment.

3. The nuclear fuel material of claim 1 wherein a substantial proportion of the uranium is reprocessed spent uranium derived from the nuclear fuel of a power generating nuclear reactor.

4. The material of claim 1 wherein the material is a powder composed of oxides of plutonium and uranium.

5. The material of claim 1 wherein the plutonium content in fissile plutonium is between 0.16% and 0.29%.

6. A core for a nuclear reactor having fuel assemblies through which a fluid coolant flows, said assemblies being composed substantially throughout of fuel elements of a homogeneous nuclear fuel material of a predetermined fissile content, for replacing enriched uranium necessary for satisfactory reactor operation, said material consisting of recycled plutonium and uranium as nuclear reactive components, wherein said plutonium content is as small as practicable considering reactor demand, said plutonium content being less than 1%, and the remainder being uranium, said material containing sufficient uranium of 235 enrichment which, when combined with the recycled plutonium, gives said material said predetermined fissile content.

7. A nuclear fuel element composed of a homogeneous nuclear fuel material of a predetermined fissile content for satisfactory reactor operation, said material consisting of recycled plutonium and uranium as nuclear reactive components, wherein said plutonium content is as small as practicable considering reactor demand, said plutonium content being less than 1% and the remainder being uranium, said material containing sufficient uranium of 235 enrichment which, when combined with the recycled plutonium, gives said material said predetermined fissible content.

* * * * *